United States Patent [19]
Kase et al.

[11] Patent Number: 4,582,888
[45] Date of Patent: Apr. 15, 1986

[54] PROCESS FOR PRODUCTION OF ISOCYANURATE RING-CONTAINING POLYISOCYANATE AND RESIN COMPOSITION FOR URETHANE PAINTS COMPRISING SAID POLYISOCYANATE AND ACRYLIC POLYOL

[75] Inventors: Mitsuo Kase; Noboru Okoshi; Kazue Tsuyuzaki, all of Chiba, Japan

[73] Assignee: Dainippon Ink and Chemicals, Inc., Tokyo, Japan

[21] Appl. No.: 706,593

[22] Filed: Feb. 28, 1985

[30] Foreign Application Priority Data

Feb. 29, 1984 [JP] Japan ................... 59-38356
Feb. 29, 1984 [JP] Japan ................... 59-38357
Apr. 16, 1984 [JP] Japan ................... 59-76321
Nov. 6, 1984 [JP] Japan ................... 59-232337

[51] Int. Cl.$^4$ .............................................. C08G 18/38
[52] U.S. Cl. ................................. 528/49; 525/330.5; 528/65; 528/85; 544/193

[58] Field of Search ................. 528/49, 65, 85; 525/330.5; 544/193

[56] References Cited

U.S. PATENT DOCUMENTS 4,040,992  8/1977  Bechana et al. ............ 544/193
4,540,781  9/1985  Bansa ....................... 544/193

Primary Examiner—Maurice J. Welsh
Attorney, Agent, or Firm—Sherman & Shalloway

[57] ABSTRACT

A process for producing a polyisocyanate containing an isocyanurate ring, which comprises reacting at least one diisocyanate compound selected from the group consisting of alkylene diisocyanates, cycloalkylene diisocyanates and aralkylene diisocyanates with a diol having a molecular weight of 100 to 1,000 and containing at least 3 hydrocarbon substituents per molecule in the presence of an isocyanurating catalyst. A resin composition for urethane paints comprising the polyisocyanate as an essential ingredient.

20 Claims, No Drawings

PROCESS FOR PRODUCTION OF ISOCYANURATE RING-CONTAINING POLYISOCYANATE AND RESIN COMPOSITION FOR URETHANE PAINTS COMPRISING SAID POLYISOCYANATE AND ACRYLIC POLYOL

This invention relates to a process for producing a polyisocyanate containing an isocyanurate ring, and to a novel and useful non-yellowing fast-drying resin composition for urethane paints. More specifically, this invention relates to a process for producing a fast-drying polyisocyanate having good compatibility with polyols, and to a resin composition comprising a combination of a specific polyisocyanate and a specific acrylic polyol which has especially superior weatherability and can be used in the field of paints for various substrates such as automobiles, buildings, electric appliances and bridges.

A number of catalysts such as tertiary amines and phosphine compounds have been known heretofore for the isocyanurating reaction of organic diisocyanates. Effective processes have already been found for the isocyanurating reaction of aromatic diisocyanates.

It has however been extremely difficult to perform effectively the isocyanurating reaction of alkylene diisocyanates, cycloalkylene diisocyanates and aralkylene diisocyanates because the selectivity of catalysts used in it is strong.

With an advance in research and development of such catalysts for isocyanurating reactions (to be referred to as isocyanurating catalysts), attempts have been made to improve these catalysts. For example, Japanese Laid-Open Patent Publication Nos. 17484/1977, 7472/1982 and 47319/1982 discloses that quaternary ammonium salts or metal carboxylate compounds can be an effective isocyanurating catalyst for diisocyanate compounds having strong selectivity for catalysts, such as alkylene diisocyanates. However, when polyisocyanates having an isocyanurate ring obtained from alkylene, cycloalkylene and/or aralkylene diisocyanates by using such a catalyst are used as a curing agent component for polyurethane resins, they have poor compatibility with polyols used as another main component, and this constitutes a very serious setback in practical application.

As one means of overcoming this setback, Japanese Laid-Open Patent Publication No. 47321/1982 proposes a method for improving the compatibility by using a polyol such as ethylene glycol, 1,3-butanediol, 1,6-hexanediol or glycerol in the isocyanurating reaction of hexamethylene diisocyanate which is one alkylene diisocyanate. This method, however, markedly reduces the inherent curing property of the polyisocyanate as a curing agent for the formation of a polyurethane resin and causes another serious trouble in practical application.

It is known on the other hand that a two-package non-yellowing urethane paint composed of a polyisocyanate as a curing agent and an acrylic polyol as a main component gives a coated film having excellent weatherability, durability, mechanical properties and chemical resistance and is industrially useful.

Non-yellowing urethane paints of the convention type, however, have the serious defect that when coated at room temperature, the resulting coated film requires a long period of time for drying (curing), and during the drying, dust adheres to the coated film and greatly reduces its finished appearance to impair its commercial value.

Adduct-type polyisocyanates obtained by the addition reaction of polyols such as trimethylolpropane with hexamethylene diisocyanate, and biuret-type polyisocyanates obtained from water and hexamethylene diisocyanate have usually been employed as the non-yellowing curing agents. However, these curing agents require long periods of time for drying when used in combination with acrylic polyols in non-yellowing urethane paints.

As an attempt to remedy this defect, a curing agent having a high softening point derived from isophorone diisocyanate has been used to some extent. Since this type of curing agent has very low reactivity and a high softening point, it cannot induce effective curing of the coated film and the properties of the coated film are considerably deteriorated.

Attempts have also been made to add a cure promoting catalyst to the aforesaid slow-drying curing agent. Since, however, the use of such a cure promoting catalyst significantly shortens the pot life of the paint, a serious trouble is inevitably caused to the coating operation.

Attempts have also been made to some extent to improve the apparent drying property by using a large amount of a hard monomer such as styrene or methyl methacrylate and thus extremely elevating the softening point of the acrylic polyol used as a main component. This method, however, inhibits the curing of the coated film and reduces its solvent resistance and mechanical properties.

Recently, polyisocyanates having an isocyanurate ring have been developed as non-yellowing curing agents. These compounds have improved drying property over the aforesaid conventional curing agents, but because of their very inferior compatibility with acrylic polyols, they cannot be used in practical application.

The prior art relating to non-yellowing urethane paints thus has the serious defects describd above in practical application.

The present inventors have made extensive investigations in view of the various defects of the prior art, and now found a process for effectively producing polyisocyanates containing an isocyanurate ring which have excellent compatibility and are industrially useful without impairing the inherent excellent curing property of isocyanurate ring-containing polyisocyanates of this type, and a very useful resin composition which can overcome the defect of requiring long drying periods in conventional non-yellowing urethane paints and the various problems of the coating operation attributed to this defect.

According to this invention, there is provided a process for producing polyisocyanates containing an isocyanurate ring, which comprises reacting a diisocyanate compound selected from the group consisting of alkylene diisocyanates, cycloalkylene diisocyanates and aralkylene diisocyanates with a diol having a molecular weight of 100 to 1,000 and containing at least 3 hydrocarbon substituents per molecule in the presence of an isocyanurating catalyst.

According to this invention, there is also provided a process which, by a proper selection of the diisocyanate compounds of the above group, can produce polyisocyanates containing an isocyanurate ring which have a variety of curing properties (drying properties), weatherabilities and mechanical properties while maintaining excellent compatibility.

The invention further provides a process for efficiently producing highly pure polyisocyanates containing an isocyanurate ring by using a compound having a low electron density and containing a highly cationic atom or atomic grouping as the isocyanurating catalyst.

Specifically, this invention provides, as the isocyanurating catalyst, choline-type benzoate derivatives represented by the general formula

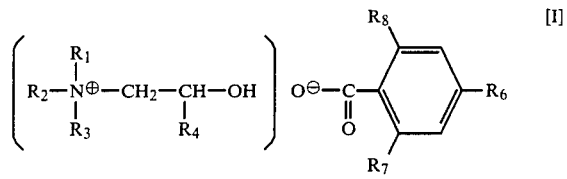

wherein
$R_1$, $R_2$ and $R_3$ are identical or different and each represents a $C_1$-$C_{20}$ hydrocarbon group or a $C_1$-$C_{20}$ hydrocarbon group containing a nitrogen, oxygen or sulfur atom, at least two of $R_1$, $R_2$ and $R_3$ may be linked to each other, $R_4$ represents a hydrogen atom, a $C_1$-$C_{20}$ hydrocarbon group or a $C_1$-$C_{20}$ hydrocarbon group containing a hydroxyl group, and $R_5$, $R_6$ and $R_7$ are identical or different and each represents a hydrogen atom or a $C_1$-$C_{20}$ hydrocarbon group, and choline-type dicarboxylate derivatives represented by the general formula

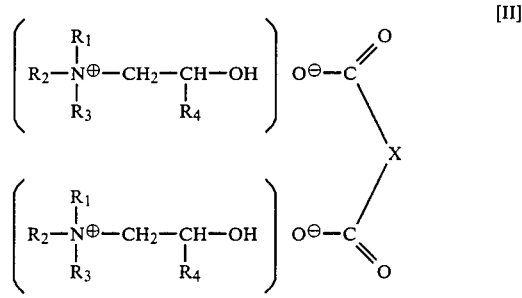

wherein
$R_1$, $R_2$ and $R_3$ are identical or different and each represents a $C_1$-$C_{20}$ hydrocarbon group or a $C_1$-$C_{20}$ hydrocarbon group containing a nitrogen, oxygen or sulfur atom, at least two of $R_1$, $R_2$ and $R_3$ may be linked to each other at the hydrocarbon groups bonded to the same quaternary nitrogen atom, $R_4$ represents a hydrogen atom or a $C_1$-$C_{20}$ hydrocarbon group, and X represents a $C_1$-$C_{20}$ dicarboxylic acid residue.

The present invention still further provides a non-yellowing fast-drying urethane paint composition comprising as essential ingredients a polyisocyanate containing an isocyanurate ring obtained by reacting a diisocyanate compound selected from the group consisting of alkylene diisocyanates, cycloalkylene diisocyanates and aralkylene diisocyanates with a diol having a molecular weight of 100 to 1,000 and containing at least 3 hydrocarbon substituents per molecule in the presence of an isocyanurating catalyst, and an acrylic polyol having a number average molecular weight of 2,000 to 30,000 and a hydroxyl value of 20 to 200.

Typical examples of the alkylene diisocyanates include 1,4-tetramethylene diisocyanates, 1,6-hexamethylene diisocyanate, 2,2,4- or 2,4,4-trimethylhexamethylene diisocyanate, 2,6-diisocyanate methyl caproate (lysine diisocyanate), and mixtures of these. Typical examples of the cycloalkylene diisocyanates include 1,3- or 1,4-diisocyanate cyclohexane, 1,3- or 1,4-bis-(isocyanatomethyl)-cyclohexane, dicyclohexylmethane-4,4'-diisocyanate, isopropylidene-bis(4-cyclohexyl isocyanate), 3-isocyanatomethyl-3,5,5-trimethylcyclohexyl isocyanate (isophorone diisocyanate), and mixtures of these. Typical examples of the aralkylene diisocyanates include xylylene diisocyanate, tetramethylxylylene diisocyanate, 4,4'-bis-(isocyanatomethyl)-diphenylmethane, and mixtures of these.

Typical examples of the diol having a molecular weight of 100 to 1,000 and containing at least 3 hydrocarbon substituents per molecule include 1,2,2-trimethyl-1,3-propanediol (2,2-dimethyl-1,3-butanediol), 2,2-dimethyl-3-isopropyl-1,3-propanediol (2,2,4-trimethyl-1,3-pentanediol), 2,2-dimethyl-3-benzyl-1,3-propanediol (2,2-dimethyl-4-phenyl-1,3-butanediol), 2,2-dimethyl-3-isobutyl-1,3-propanediol (2,2,4-trimethyl-1,3-hexanediol), 2,2,3,3-tetramethyl-1,4-butanediol, 2,2,4-trimethyl-1,5-pentanediol, 2,2,4-trimethyl-1,6-hexanediol, 4,4-trimethyl-1,6-hexanediol, and mixtures of these. Especially preferred are those diols which contain alkyl groups as the hydrocarbon substituent, particularly 2,2,4-trimethyl-1,3-pentanediol.

In practicing the process of this invention, at least one of the diisocyanates described above can be used. It should be noted however that as a means of maintaining the highest possible compatibility of the resulting isocyanurate ring-containing polyisocyanate with the acrylic polyol which has particularly poor compatibility with the above polyisocyanate among polyols, the amount of the aralkylene diisocyanate may be limited to not more than 50 mole% based on the total amount of the alkylene diisocyanate and the cycloalkylene diisocyanate. This quantitative limitation is also necessary where the weatherability of various products obtained by using the isocyanurate ring-containing polyisocyanate is especially important. This is because aralkylene diisocyanates generally have lower weatherability than alkylene diisocyanates and cycloalkylene diisocyanates.

The suitable amount of the diol used is generally about 0.3 to 30 mole% based on the total amount of the diisocyanate compounds.

The diol used in this invention has a molecular weight of 100 to 1,000. A mixture of diols having molecular weights within this range may also be used.

The present invention, however, does not in any way exclude the use of diols having a molecular weight of more than 1,000, and this molecular weight can freely be changed so long as the objective of this invention can be achieved. Generally, however, the use of diols having a molecular weight exceeding 1,000 causes a reduction in the content of isocyanate groups in the resulting isocyanurate ring-containing polyisocyanate, and is not preferred in general.

The isocyanurating catalyst is a substance effective for isocyanurating and polymerizing the diisocyanate compounds, namely for obtaining polyisocyanates containing an isocyanurate ring by polymerizing the diisocyanate compounds to trimers, pentamers, heptamers, etc. It denotes compounds having a low electron density and containing a strongly cationic atom or atomic grouping such as quaternary nitrogen, sodium or potassium.

The catalyst may contain two or more strongly cationic atoms or atomic groupings. Or it may contain in the molecule an atomic grouping containing active hydrogen reactive with the isocyanate groups, such as a hydroxyl group in addition to such cationic atoms or atomic groupings.

Many studies have previously been made on isocyanurating catalysts for organic isocyanate compounds of the above type, and many catalysts such as tertiary amines or phosphine compounds have been known. Many of them, however, depend upon the types of the organic isocyanate compounds for their effect and are limited in use. For example, they may be effective on aromatic isocyanates, but show no catalytic activity on aliphatic isocyanates. Some catalysts have the defect that isocyanate dimers such as uretidine dione or a carbodiimide linkage is formed as by-products, and such by-products color the final desired product.

The compounds of general formula [I] or [II] are useful compounds which eliminate the various defects of the aforesaid known isocyanurating catalysts.

Typical examples of the choline-type benzoate derivatives of general formula [I] are compounds having the structures of the following formulae [Ia] to [Ig].

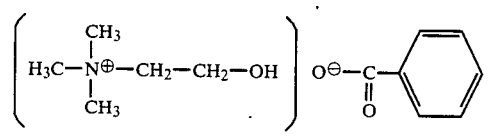
[Ia]

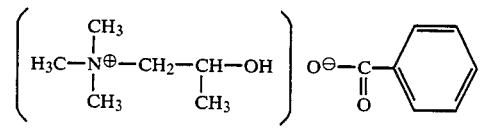
[Ib]

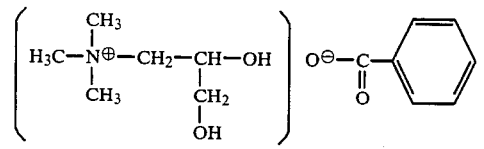
[Ic]

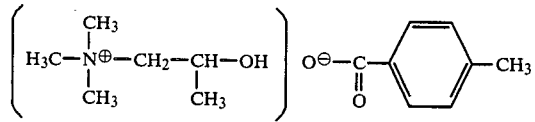
[Id]

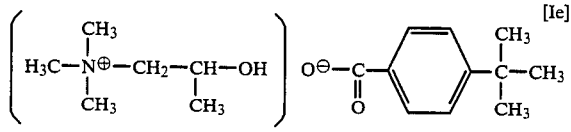
[Ie]

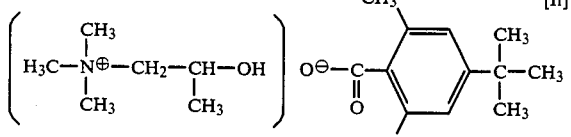
[If]

and

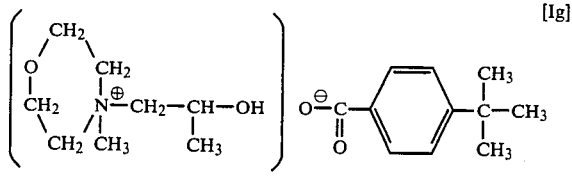
[Ig]

The quaternary ammonium salt compounds of general formula [I] typified by the compounds of the formulae [Ia] to [Ig] are the derivatives of choline which is a compound represented by the following formula [III].

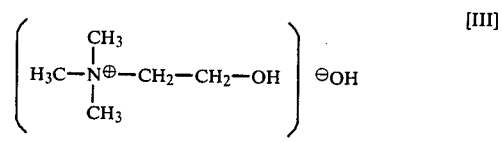
[III]

They can be produced by the methods described, for example, in Beilsteins Handbuch der Organischen Chemie, erster Teil (Synst. Nr. 353), 651 (1962), T. Bonnet et al., "The Journal of American Chemical Society", Vol. 58, No. 22 (1936), and Japanese Laid-Open Patent Publication No. 17484/1977, or by their modified methods.

The suitable amount of the isocyanurate catalyst is 20 to 2,000 ppm based on the total amount of the diisocyanate compounds charged.

Generally, the isocyanurating catalyst is used after it is diluted with an organic solvent capable of dissolving it. Suitable solvents are dimethylacetamide, N-methylpyrrolidone and butyl Cellosolve acetate. There can also be used various alcohols such as ethanol, n-butanol, 2-ethylhexyl alcohol, benzyl alcohol, butyl Cellosolve, propylene glycol and 1,3-butanediol.

The choline-type dicarboxylate derivatives of general formula [II] are compounds not described in the literature. They are useful in various industrial uses including isocyanurating catalysts for alkylene, cycloalkylene and aralkylene diisocyanates.

The compounds of general formula [II] can be obtained, for example, by reacting a tertiary amine, an epoxide and a divalent organic acid compound as schematically shown by the following formula [IV].

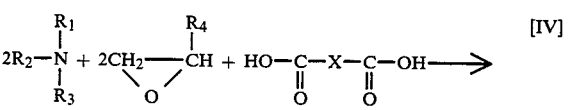
[IV]

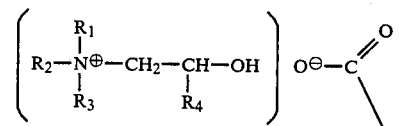

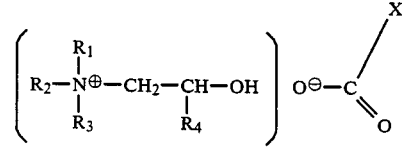
[II]

In the above scheme, $R_1$, $R_2$, $R_3$, $R_4$ and X are as defined hereinabove.

Typical examples of the tertiary amine are trimethylamine, triethylamine, N,N-dimethylbenzylamine and N-methylmorpholine. Typical examples of the epoxide are ethylene oxide, propylene oxide, 1,2-butylene oxide and styrene oxide. Typical examples of the divalent organic acid compound are succinic acid, adipic acid, azelaic acid and phthalic acid.

The above reaction for the production of the compounds of formula [II] may be carried out at a temperature of 10° to 100° C., preferably 20° to 80° C.

Typical examples of the compounds of general formula [II] so obtained are shown below.

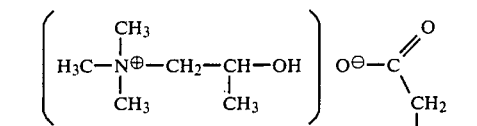 [IIa]

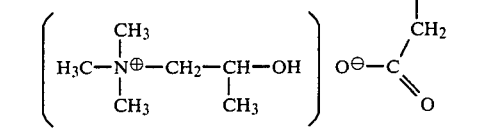 [IIb]

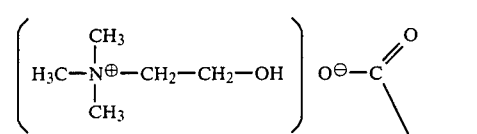

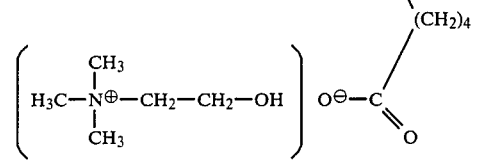 [IIc]

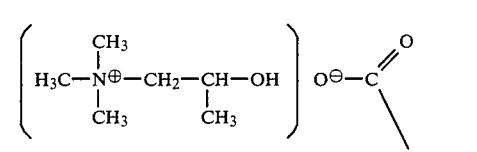

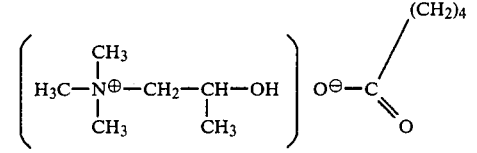 [IId]

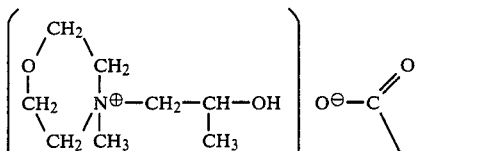

and

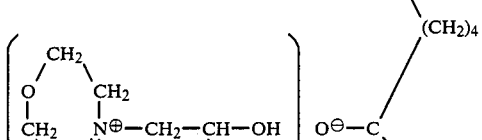

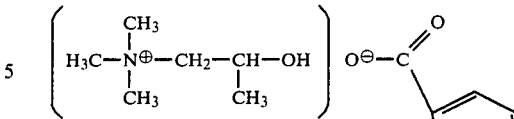 [IIe]

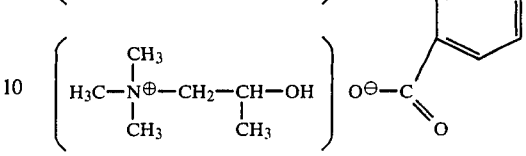

The compounds of general formula [II] are useful as an isocyanurating catalyst, a urethanizing catalyst, or a catalyst for ring-opening addition of an epoxy group, for example in a reaction between a bisphenol and an epoxide. They are also useful as cationic emulsifiers. These compounds have high catalytic activity when used as an isocyanurating catalyst for organic isocyanates. Usually, therefore, the amount of this isocyanurating catalyst may be as small as 20 to 2,000 ppm.

Besides the above-exemplified compounds containing a quaternary nitrogen atom, compounds containing sodium or potassium may also be used. Typical examples of such compounds are sodium propionate, potassium propionate, sodium ethoxide, sodium n-butoxide and sodium 2-n-butoxide. These compounds may also be used ordinarily in small amounts of 20 to 2,000 ppm.

The range of application of the compounds of formula [II] is broad, and can be broadly applied not only to aromatic diisocyanates, but also to araliphatic, aliphatic and alicyclic organic isocyanates.

In performing the process of this invention in the presence of the isocyanurating catalyst, compounds having active hydrogen reactive with the isocyanate groups in the molecule, such as alcohols, phenols, thiols or amines, may be used as promoters or co-catalysts. The use of such a promoter increases the catalytic effect of the isocyanurating catalyst and enables the amount of the catalyst to be decreased. The alcohols are especially suitable as the promoter because they generally have little tendency to impair the inherent excellent weatherability of polyisocyanates obtained in the absence of such a promoter.

Typical examples of the alcohols as the promoter include monohydric alcohols such as methanol, ethanol, n-butanol, 2-ethylhexyl alcohol, benzyl alcohol and butyl Cellosolve, and dihydric alcohols such as ethylene glycol, propylene glycol, 1,3-butanediol, 1,4-butanediol, neopentyl glycol, and 1,6-hexanediol. As desired, trihydric alcohols such as glycerol, trimethylolethane and trimethylolpropane may also be used. If desired, diols having a molecular weight of 1,000 and containing at least 3 hydrocarbon substituents per molecule may be used together with the alcohols. Examples of such diols include 1,2,2-trimethyl-1,3-propanediol (2,2-dimethyl-1,3-butanediol), 2,2-dimethyl-3-isopropyl-1,3-propanediol (2,2,4-trimethyl-1,3-pentanediol), 2,2-dimethyl-4-phenyl-1,3-butanediol), 2,2-dimethyl-3-isobutyl-1,3-propanediol(2,2,4-trimethyl-1,3-hexanediol), 2,2,3,3-tetramethyl-1,4-butanediol, 2,2,4-trimethyl-1,5-pentanediol, 2,2,4-trimethyl-1,6-hexanediol and 2,4,4-trimethyl-1,6-hexanediol.

The suitable amount of the alcohol used as the promoter is usually not more than 6 mole%, preferably not more than 3 mole%, based on the total amount of the diisocyanate compounds.

Generally, as the amount of the alcohol promoter used is increased, the amount of the isocyanurating catalyst can be decreased. If, however, the amount of the alcohol is too large, the curability (drying property) of a polyurethane resin in the presence of the resulting isocyanurate ring-containing polyisocyanate as a curing agent is markedly reduced. Usually, it is desirable to limit the amount of the alcohol to a smaller one.

Those alcohols used as the promoter which are liquid at ordinary temperature and have the ability to dissolve the isocyanurating catalyst may also be used as diluents for the isocyanurating catalyst. When a pair or the whole of the alcohol is used as a diluent, the above consideration should also be given to its amount.

Typical examples of the phenols as the promoter are phenol, resol, p-tert-butylphenol and 2,6-dimethyl-tert-butylphenol. The suitable amount of the phenol is usually not more than 5 mole%, preferably not more than 2 mole%, based on the total amount of the isocyanurating catalyst.

Generally, the phenol promoter also has a higher catalytic effect as its amount becomes larger. But since it is deleterious on the weatherability of the resulting polyisocyanate, its amount should be made as small as possible.

The isocyanurating reaction of this invention using the various materials described above can be carried out usually at a temperature of 20° to 120° C. At temperatures exceeding 120° C., the activity of the catalyst is reduced, or the resulting polyisocyanate is undesirably colored to reduce its commercial value.

The mode of reaction used in the practice of the process of this invention may be a batch or continuous mode.

By using the aforesaid isocyanurating catalyst either alone or in combination with the promoter, the isocyanurating reaction can be carried out smoothly, and the formation of the polyisocyanate as a result of this reaction and an increase in its molecular weight can be predicted by measuring changes in the refractive index of the reaction system. Hence, the final isocyanurate ring-containing polyisocyanate having the desired molecular weight can be prepared very easily.

In the process of this invention, the catalyst can be used in a pure form or in a form diluted with an organic solvent capable of dissolving the catalyst. Typical examples of the solvent used as a diluent include dimethylacetamide, N-methylpyrrolidone and butyl Cellosolve acetate. Various alcohols such as ethanol, n-butanol, 2-ethylhexyl alcohol, butyl Cellosolve and benzyl alcohol may be used. If desired, various polyols suchas 1,3-butanediol and 1,6-hexanediol may also be used.

Since the diol used as a reactant in this invention has the effect of a promoter by itself, it is not necessary to use the promoter together in the process of this invention unless it is specially required.

It is known that among the diluting solvents mentioned above, the alcohols generally act as a promoter in the isocyanurating reaction. However, in the process of this invention, the amount of the alcohol should desirably be limited to one required as a diluting solvent for the catalyst. If its amount is excessively large, the curability (drying property) of the resulting isocyanurate ring-containing polyisocyanate is reduced undesirably.

In other words, during the isocyanurating reaction of the diisocyanate compound in the presence of the isocyanurating catalyst in the process of this invention, urethanizing reaction occurs between the diol as a reactant and the diisocyanate compound and the resulting adduct exhibits the effect of a promoter for the isocyanurating reaction.

Accordingly, the isocyanurating reaction in accordance with this invention may be carried out, for example, by (1) a method which comprises mixing all of the diisocyanate compound and the diol in a reactor and simultaneously adding the isocyanurating catalyst to induce the reaction, preferably (2) a method which comprises first uniformly mixing the two reactant compounds by such means as heating with stirring, then adding the isocyanurating catalyst, and starting the reaction, more preferably (3) a method which comprises first completely reacting the two reactant compounds, then adding the isocyanurating catalyst, and performing the reaction.

As stated above, the process of this invention can be carried out batchwise or continuously. Usually, it is desirable in the process of this invention to terminate the reaction when the conversion has reached a point which is properly preset so that the amount of the final polyisocyanate formed is within the range of 20 to 65% by weight based on the total amount of the starting materials charged. For example, if the conversion exceeds 65% by weight, the molecular weight of the resulting polyisocyanate becomes too high, and the polyisocyanate cannot fully exhibit practical properties meeting the objective of this invention. Furthermore, when the conversion is increased extremely, the resulting polyisocyanate undesirably gels in the reactor.

After the reaction, the used isocyanurating catalyst can be easily deactivated with a deactivating agent, for example various acids such as dodecylbenzenesulfonic acid, monochloroacetic acid, monofluoroacetic acid and phosphoric acid, and halogenation products of various organic acids such as benzoyl chloride.

After the deactivation of the catalyst, volatile substances such as the unreacted diisocyanate compound can be easily removed from the reaction mixture by molecular distillation of various types in, for example, a thin film rotary evaporator or a centrifugal thin film evaporator, various extracting methods in a column-type or rotary device, or similar removing means. As a result, the desired polyisocyanate containing an isocyanurate ring can be obtained.

By properly selecting the starting materials, the conversion of the reaction, etc., the process of this invention gives polyisocyanates containing an isocyanurate ring which are colorless to pale yellow and liquid to solid at room temperature and have a molecular weight of 500 to 1,200. The resulting polyisocyanates can be used directly in pure form, or in a form diluted properly with various organic solvents inert to the isocyanate groups, such as ethyl acetate, butyl Cellosolve acetate, methyl isobutyl ketone and xylene.

According to the process of this invention, useful polyisocyanates containing an isocyanurate ring which have a variety of levels of curability (drying property), mechanical properties, chemical resistance and weatherability can be very easily designed by using the diisocyanate compounds selected from the group consisting of the aforesaid alkylene, cycloalkylene and aralkylene diisocyanates. Since in the process of this invention, the reaction can be started smoothly, and controlled very easily, the molecular weight of the final polyisocyanate can be easily controlled.

The isocyanurate ring-containing polyisocyanates produced by the process of this invention having the above characteristics are industrially very important as curing agents for polyurethane resins, and in combination with various polyols for polyurethane resins, such as polyester polyols including alkyd resins, polyethers and acrylic polyols, and substances having a group (such as a hydroxyl group) reactive with the isocyanate group, such as epoxy resins, can provide various industrial materials such as foams, paints, adhesives, elastomers, RIM (reaction injection molding) materials, and composite materials including ACM (advanced composite materials).

The diisocyanates described above can be used either singly or in combination, and give polyisocyanates as curing agents for non-yellowing urethane paints having excellent drying property. In order to maintain the drying property of such a curing agent most suitable and obtain a good balance of properties such as mechanical properties and weatherability, the use of a mixture of an alkylene diisocyanate and a cycloalkylene diisocyanate in a weight ratio of from 85:15 to 55:45. Likewise, the use of a mixture of an alkylene diisocyanate and an aralkylene diisocyanate in a weight ratio of from 95:5 to 70:30 is also effective to maintain the drying property and other properties of the curing agent most suitable. The cycloalkylene diisocyanates, above all isophorone diisocyanate, should desirably be used in combination with the other types of the diisocyanates in the aforesaid amounts because they have low reactivity with the isocyanate groups.

The diols having a molecular weight of 100 to 1,000 and containing at least 3 hydrocarbon substituents per molecule are very effective for improving the compatibility of the polyisocyanates containing an isocyanurate ring with acrylic polyols without reducing their inherent excellent drying property (curing property). To maintain a high isocyanate content of the polyisocyanates, the suitable amount of the diol is within the range of 0.3 to 30 mole%, preferably 3 to 20 mole%, based on the total amount of the diisocyanate compound.

The use of ordinary diols such as propylene glycol and 1,3-butanediol are not desirable because they greatly reduce the drying property of the polyisocyanates. Monohydric alcohols and trihydric or higher polyols are likewise not desirable. In particular, the polyols excessively increases the degree of functionality of the polyisocyanates and increase their viscosity to an unnecessarily high degree. The inclusion or conjoint use of a small amount of a monohydric alcohol or a triol in the diol used in this invention is permissible to an extent that does not deteriorate the properties of the polyisocyanates.

As stated above, the polyisocyanate containing an isocyanurate ring, one essential ingredient of the composition of this invention, can be obtained by subjecting the diisocyanate compound and the diol to isocyanurating reaction in the presence of the various isocyanurating catalysts described above optionally in combination with the various promoters. Suitable isocyanurate ring-containing polyisocyanates for use in the composition of this invention usually have a number average molecular weight of 550 to 1,200 and as a solution in an organic solvent in a concentration of 75%, have an isocyanate content of 10 to 17% by weight.

Various organic solvents inert to the isocyanate groups, such as ethyl acetate, butyl acetate, toluene, xylene and Cellosolve acetate, can be used as diluents for the polyisocyanates.

The acrylic polyol having a number of average molecular weight of 2,000 to 30,000 and a hydroxyl value of 20 to 200, another essential ingredient of the composition of this invention, can be obtained, for example, by radical polymerization of an ethylenic hydrocarbon derivative of formula [V], [VI], [VII] or [VIII] below as a main material.

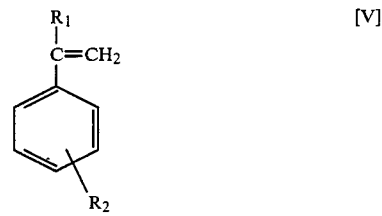

wherein
each of $R_1$ and $R_2$ represents a hydrogen atom or a $C_1$–$C_{13}$ hydrocarbon group which may contain an oxygen atom.

Examples of the compounds of formula [V] are styrene, alpha-methylstyrene, p-methylstyrene, p-methoxystyrene and p-tert.-butylstyrene.

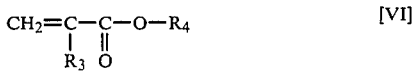

wherein
$R_3$ represents a hydrogen atom or a $C_1$–$C_{12}$ hydrocarbon group, and $R_4$ represents a $C_1$–$C_{12}$ hydrocarbon group which may contain an oxygen or nitrogen atom.

Examples of the compounds of general formula [VI] include methyl methacrylate, n-butyl methacrylate, isobutyl methacrylate, t-butyl methacrylate, 2-ethylhexyl methacrylate, ethyl acrylate, n-butyl acrylate, 2-ethylhexyl acrylate and 2-ethoxyethyl acrylate.

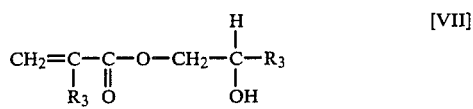

wherein
$R_3$ and $R_4$ are as defined above.

Examples of the compounds of general formula [VII] are beta-hydroxyethyl methacrylate, beta-hydroxypropyl methacrylate and beta-hydroxyethyl acrylate.

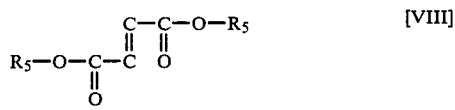

wherein
$R_5$ represents a $C_1$–$C_{12}$ hydrocarbon group.

Examples of the compounds of general formula [VIII] are diethyl fumarate, di-n-butyl fumarate, diisobutyl fumarate and di-2-ethylhexyl fumarate.

Other examples of the ethylenic hydrocarbon derivatives which are used in producing the acrylic polyols include carboxy-containing ethylenic hydrocarbons such as methacrylic acid, acrylic acid and itaconic acid, and oxirane ring-containing ethylenic hydrocarbon derivatives such as glycidyl methacrylate. The acrylic polyols may be easily prepared from the above ethylenic hydrocarbon derivatives by radical polymerization in a customary manner using a known radical initiator such as benzoyl peroxide, azobisisobutyronitrile, t-butyl peroctoate, di-t-butyl peroxide and t-butyl perbenzoate.

The radical polymerization is carried out usually at a temperature of 60° to 150° C. in an organic solvent such as toluene, xylene or butyl acetate.

The acrylic polyols have a molecular weight of 2,000 to 30,000, preferably 3,000 to 20,000. If the molecular weight of the polyols is too low, a fast-drying paint is difficult to obtain. If it is too high, the resulting composition has reduced operability in coating. The acrylic polyols have a hydroxyl value of 20 to 200, preferably 30 to 120. If the hydroxyl value of the polyols is too low, it is difficult to obtain a coated film having good properties. If it is too high, the amount of the expensive polyisocyanate used becomes large to cause such defects as economic losses.

The glass transition point (Tg) of the acrylic polyols is desirably not too low in order to obtain good drying property, but is not particularly limited. Usually, it is preferably at least 25° C., especially preferably at least 30° C. If the Tg is too high, the coated film tends to lose flexibility. Generally, the Tg of the acrylic polyols is desirably not more than 80° C., more preferably not more than 70° C.

When it is particularly desired, the acrylic polyols may be those modified with polyesters including alkyd resins. The amount of the polyesters used as a modifier is desirably not more than 50% by weight, preferably not more than 30% by weight, in order not to impair the inherent excellent weatherability of the acrylic polyols.

When the resin composition of this invention comprising the isocyanurate ring-containing polyisocyanate and the acrylic polyols as essential ingredients is to be used as a paint, it is proper to blend the two components so that the isocyanate groups and the hydroxyl groups exist in equal equivalent weights, namely the equivalent ratio of NCO/OH is 1.0. When a paint having especially good properties is desired, the two components are blended in such properties that the NCO/OH equivalent ratio becomes from 0.3 to 2.0, preferably from 0.8 to 1.2.

The resin composition of this invention for urethane paints can be used directly as a clear varnish, or as an enamel paint after incorporating various pigments or body pigments (extender pigments) such as titanium white, carbon black and cyanine blue.

The composition of this invention in the form of such a clear varnish or an enamel is a two-package paint composed of the acrylic polyols as a main component and the isocyanurate ring-containing polyisocyanate as a curing agent. The pigment in the enamel is usually incorporated in the main component. Ordinary thinners used for urethane paints may be used as diluting solvents.

When the composition of this invention is to be used as a paint, known conventional additives, for example celluloses such as cellulose acetate butyrate or nitrocellulose, plasticizers, levelling agents or surface-active agents may be used together. If particularly desired, a curing catalyst may also be used together.

The two-package paint is used by mixing the curing agent and the main component immediately before application. The mixture is coated on a substrate in a customary manner by air spraying, airless spraying, electrostatic coating, roll coating, etc. to give a coated film having good drying property and good film properties. If particularly desired, the coating may be forcibly dried at a temperature of 40° to 100° C. to obtain a cured film within a very short period of time. This procedure can also give a coated film of good quality.

The composition of this invention is especially useful as a non-yellowing fast-drying urethane-paint for coating various substrates such as iron, various nonferrous metals, inorganic materials and plastic materials.

The following Referential Example, Examples, and Comparative Examples illustrate the present invention more specifically. It should be understood however that the invention is in no way limited to these examples. All percentages in these examples are by weight unless otherwise stated, and M means molecular weight.

REFERENTIAL EXAMPLE 1

A 500 ml glass flask equipped with a stirrer, a condenser and a thermometer was charged with 150 g of butyl Cellosolve, 73.1 g (0.5 mole) of adipic acid (M=146.2), and with stirring, trimethylamine (M=59.1) was introduced into the flask. Introduction of trimethylamine was continued until the weight of the reaction system increased by 59.1 g.

Then, 58.5 g of propylene oxide (M=58.1) was gradually added at 20° C. The mixture was continuously stirred over the course of 4 hours, and then left to stand overnight to give 346 g of a 55% butyl Cellosolve solution of the desired product.

Ten gram of the solution of the product was purified by re-precipitation using 200 g of hexane, followed by drying under reduced pressure.

A 5.1 g aliquot of the final product was subjected to various analyzing tests. The analysis data given in Table 1 were obtained.

TABLE 1

| Item of analysis | Analytical data | | |
|---|---|---|---|
| IR spectrum | >C=O 1570, 1390 cm$^{-1}$ | | |
| NMR spectrum | Chemical shift (ppm) | | Number of the corresponding protons |
| | δ-CH$_3$ | 1.2 | 6 |
| | δ-CH$_2$-*CH$_2$-*CH$_2$-CH$_2$- | 2.6 | 4 |
| | δ-CH$_2$—CO— | 2.3 | 4 |
| | δ>N—CH$_3$ <br> δ-CH$_2$—OH <br> δ>CH$_2$—OH | 3.1–3.6 | 18 |
| | δ>N—CH< | 4.3 | 6 |
| | δ>N—CH$_2$— | 4.0 | |
| Amine equivalent | 5.2 meg/g (calculated 5.25 meg/g) | | |
| Molecular weight (*1) | 384.6 (calculated 380.60 for $^{12}C_{18}{}^1H_{40}{}^{16}O_6{}^{14}N_2$) | | |
| Elemental analysis | Found | | Calculated |
| | C 56.2 | | C 56.8 |
| | H 10.8 | | H 10.61 |
| | O 25.9 | | O 25.22 |
| | N 7.0 | | N 7.36 |

*Calculated from the amine equivalent value.

The above analysis results led to the determination that the final product was bis(beta-methylcholine)adipate corresponding to the structural formula [IIc] given hereinabove.

EXAMPLE 1

A 2-liter glass flask equipped with a stirrer, a nitrogen gas introducing tube, an air cooling tube and a thermometer was charged with 1,400 g (8.32 moles) of hexamethylene diisocyanate (HMDI for short; M=168.2) and 30 g (0.21 mole) of 2,2,4-trimethyl-1,3-pentanediol (TMPD for short; M=146.2) under an atmosphere of nitrogen gas. An oil bath was attached to the flask, and the temperature was raised to 55° C. with stirring. For confirmation, the refractive index ($n_D^{25}$) of the mixture was measured and found to be 1.4500.

A 20% butyl Cellosolve solution of beta-methylcholine benzoate of the above formula [Ib] (CB for short; M=239.3) as an isocyanurating catalyst was added portionwise to the flask. When 2.9 g (2.42 millimoles/liter=405 ppm) in total of the catalyst solution was added, the reaction began and exotherm was observed. The temperature in the reactor rose to 63° C. After the exotherm ceased, the temperature of the inside of the flask was maintained at 60° C., and when the refractive index of the reaction mixture reached 1.4640, 3.9 g (2.39 millimoles) of a 5.8% xylene solution of monochloroacetic acid (M=94.5) was added as a catalyst deactivator to the reactor to terminate the reaction.

The reaction mixture was cooled to room temperature, and 1,000 g of it was subjected to molecular distillation to obtain 333.3 g (conversion=33.4%) of the desired polyisocyanate and 664.7 g (recovery ratio=66.6%) of a distillate.

The resulting polyisocyanate was a liquid substance having flowability at room temperature. It was diluted with ethyl acetate to a concentration of 75% to obtain 443.2 g of a solution.

The resulting polyisocyanate solution had a non-volatile content (NV) of 75.2%, a Gardner color number (all color numbers given hereinafter are those of Gardner) of not more than 1, a Gardner viscosity at 25° C. (all viscosities given hereinafter are thse of Gardner) of $A_1$ to $A_2$, and an NCO content of 15.5%. Analysis led to the determination that the polyisocyanate contained an isocyanurate ring. The molecular weight of the polyisocyanate was found to be 640.

The distillate obtained by molecular distillation was analyzed and determined to consist substantially of pure HMDI.

EXAMPLE 2

Example 1 was repeated except that 1,400 g of HMDI and 80 g (0.55 mole) of TMPD were used as the starting materials and the reaction was carried out such that the refractive index of the mixture of the materials after holding at 55° C. for 1 hour reached 1.4512.

The mixture was subjected to isocyanurating reaction in the same way as in Example 1 except that 1.9 g (1.59 millimoles; 257 ppm) of a butyl Cellosolve solution of CB in a concentration of 20% was added as an isocyanurating catalyst, and 2.6 g (1.60 millimoles) of a 5.8% xylene solution of monochloroacetic acid was added when the refractive index of the reaction mixture reached 1.4630. As a result, 351.3 g (conversion=35.2%) of a polyisocyanate having flowability at room temperature and 646.7 g (recovery ratio 64.8%) of a distillate were obtained.

The resulting polyisocyanate was diluted with ethyl acetate to a concentration of 75% to obtain 466.5 g of a solution. The solution had an NV of 75.4%, a color number of not more than 1, a viscosity of $A_2$ and an NCO content of 14.2%. Analysis led to the determination that the polyisocyanate contained an isocyanurate ring. Its molecular weight was found to be 670.

The distillate obtained by molecular distillation was analyzed and determined to consist substantially of pure HMDI.

EXAMPLE 3

The same reaction as in Example 2 was carried out except that 1.0 g (0.68 millimole; 135 ppm) of a 20% butyl Cellosolve solution of beta-methylcholine-p-tert-butyl benzoate (CPB for short; M=295.4) (which may also be called N,N,N-trimethyl-N-2-hydroxypropyl ammonium p-tert-butyl benzoate) having the structure of formula [Ie] was used instead of the butyl Cellosolve solution of CB. When the refractive index of the reaction mixture reached 1.4627, the catalyst as deactivated to terminate the reaction.

After molecular distillation, the conversion of the reaction was 33.9%. A solution of the polyisocyanate diluted with ethyl acetate had an NV of 75.2%, a color number of not more than 1, a viscosity of $A_2$ and an NCO content of 14.2%. The molecular weight of the polyisocyanate was found to be 667.

EXAMPLE 4

The same reaction as in Example 1 was carried out except that 1,400 g (7.21 moles) of 1,3-bis-(isocyanatomethyl)cyclohexane ($H_6XDI$ for short; M=194.2), 60 g (0.41 mole) of TMPD and 2.4 g (1.62 millimoles; 329 ppm) of a 20% butyl Cellosolve solution of CPB were used as the starting materials. The refractive index of a mixture of the materials before the addition of the catalyst was 1.4821. When the refractive index of the reaction mixture reached 1.4972, the catalyst was deactivated to terminate the reaction.

The conversion after molecular distillation was 42.3%. A solution of the resulting polyisocyanate diluted with ethyl acetate had an NV of 74.9%, a color number of not more than 1, a viscosity of I to J and an isocyanate content of 13.2%. The polyisocyanate was determined to contain an isocyanurate-ring, and the molecular weight of the polyisocyanate was found to be 630.

EXAMPLE 5

The same reaction as in Example 1 was carried out except that 1,300 g (7.23 moles) of HMDI, 100 g (0.53 mole) of xylylene diisocyanate (XDI for short; M=188.2), 60 g (0.41 mole) of TMPD and 2.2 g (149 millimoles; 301 ppm) of a 20% butyl Cellosolve solution of CPB were used as the starting materials. Before the addition of the catalyst, the mixture had a refractive index of 1.4651. When the refractive index of the reaction mixture reached 1.4700, the catalyst was deactivated to terminate the reaction.

After molecular distillation, the conversion was 35.2%. A solution of the resulting polyisocyanate diluted with ethyl acetate had an NV of 75.3%, a color number of not more than 1, a viscosity of B-C and an NCO content of 13.4%. The resulting polyisocyanate was determined to contain an isocyanurate ring. The molecular weight of the polyisocyanate was found to be 754.

EXAMPLE 6

A 2-liter four-necked glass flask equipped with a stirrer, a nitrogen gas introducing tube, an air cooling tube and a thermometer was charged with 1,400 g (8.32 moles) of hexamethylene diisocyanate (M=168.2) and 50 g (0.34 mole) of 2,2,4-trimethyl-1,3-pentanediol (TMPD for short; M=146.2). An oil bath was attached to the flask, and with stirring, the temperature was raised to 55° C. The mixture was maintained at this temperature for about 1 hour, and then, a 20% butyl Cellosolve solution of beta-methylcholine-p-tert-butyl benzoate (M=295.4) of the structural formula [Ie] was added as an isocyanurating catalyst portionwise to the flask. When 1.3 g (0.88 millimole) in total of the catalyst solution was added, the reaction began and exotherm was observed. The temperature of the reactor rose to 62° C. After the exotherm ceased, the reaction was continued for a total period of 4.6 hours while maintaining the inside of the reactor at 60° C. As a catalyst deactivator, 1.3 g (0.94 millimole) of a 6.8% xylene solution of monochloroacetic acid (M=94.5) was added to the reactor to terminate the reaction.

The reaction mixture was then cooled to room temperature. One thousand grams of it was subjected to molecular distillation to give 331.3 g (conversion 33.2%) of the desired polyisocyanate and 668.7 g (recovery ratio=66.8%) of a distillate.

The resulting polyisocyanate was a liquid substance having flowability at room temperature. The polyisocyanate was diluted with ethyl acetate to a concentration of 75% to obtain a polyisocyanate solution (designated "P1").

The polyisocyanate solution P1 had an NV of 75.3%, a color number of not more than 1, a viscosity at 25° C. of $A_1$ to A, and an NCO content of 15.0%. Analysis led to the determination that the polyisocyanate contained an isocyanurate ring. Its molecular weight was found to be 643.

The distillate obtained by molecular distillation was also analyzed and determined to consist substantially of pure HMDI.

A two package urethane paint was prepared by using the resulting polyisocyanate solution P1 and "Acrydic A-800" (an acrylic polyol produced by Dainippon Ink and Chemicals, Inc.; M=16,000; hydroxyl value=50). As shown in Table 3, testing of this paint demonstrated that it had superior drying property and better film properties than paints composed of "Burnock DN-950" (which is a non-yellowing polyisocyanate of the adduct type produced by Dainippon Ink and Chemicals, INc.), a commercial polyisocyanate A and a polyisocyanate (T2) produced in Comparative Example 2, respectively.

EXAMPLE 7-9

Polyisocyanates P2 to P4 containing an isocyanurate ring were obtained by the same method as in Example 6 except that different formulations of starting materials were used. Table 2 summarizes the formulations of P2 to P4 and the properties and compositions of the polyisocyanates. As shown in Table 3, paints obtained from these polyisocyanates and "Acrydic A-800" had excellent drying property and film properties. The results of Table 3 particularly show that the paints obtained from P3 and P4 had excellent drying property and a good balance of mechanical properties.

COMPARATIVE EXAMPLES 1 AND 2

Polyisocyanates T1 and T2 containing an isocyanurate ring were produced by the same method as in Example 6. Table 2 summarizes the starting material formulations of the polyisocyanates T1 and T2 and the properties and compositions of the polyisocyanates.

TABLE 2

|  | Products of Example | | | | Products of Comparative Example | |
|---|---|---|---|---|---|---|
|  | P1 | P2 | P3 | P4 | T1 | T2 |
| Formulation (g) | | | | | | |
| HMDI | 1,400 | 0 | 980 | 1,316 | 1,400 | 1,400 |
| H6XDI | 0 | 1,400 | 420 | 0 | 0 | 0 |
| XDI | 0 | 0 | 0 | 84 | 0 | 0 |
| TMPD | 50 | 50 | 50 | 50 | 0 | 0 |
| 1,3-BG | 0 | 0 | 0 | 0 | 0 | 50 |
| Properties of the resin | | | | | | |
| NV (%) | 75.3 | 75.1 | 75.2 | 74.8 | 75.0 | 75.0 |
| Viscosity | $A_1$-A | I-J | B | B-C | $A_2$-$A_1$ | $A_2$-$A_1$ |
| NCO (%) | 15.0 | 13.4 | 14.1 | 13.8 | 16.4 | 14.8 |
| Molecular weight | 655 | 640 | 675 | 730 | 620 | 655 |
| Composition of the starting materials in the polyisocyanate (%, estimated) (*) | | | | | | |
| HMDI | 90 | 0 | 65 | 70 | 100 | 91 |
| H6XDI | 0 | 91 | 28 | 0 | 0 | 0 |
| XDI | 0 | 0 | 0 | 19 | 0 | 0 |
| TMPD | 10 | 9 | 7 | 11 | 0 | 0 |
| 1,3-BG | 0 | 0 | 0 | 0 | 0 | 9 |

(*): Estimated values based on the results of analysis
1,3-BG: 1,3-Butane diol.

TABLE 3

|  | Example | | | | Comparative Example | | | |
|---|---|---|---|---|---|---|---|---|
|  | 6 | 7 | 8 | 9 | 1 | 2 | 3 | 4 |
| Polyisocyanate | P1 | P2 | P3 | P4 | T1 | T2 | DN-950 | A |
| Drying property (dust-free time) | | | | | | | | |
| Clear varnish (minutes) | 65 | 20 | 35 | 35 | — | 140 | 120 | 110 |
| White enamel (minutes) | 35 | 15 | 25 | 25 | — | 80 | 65 | 65 |
| Properties of the air-dried coated film (20° C.; 7 days after coating) | | | | | | | | |
| Gloss | 92 | 93 | 92 | 92 | — | 93 | 92 | 92 |
| Hardness | F-H | F-H | F-H | F-H | — | F | F | F |
| Adhesion strength | 100/100 | 85/100 | 100/100 | 100/100 | — | 100/100 | 100/100 | 100/100 |
| Erichsen | >7 | 1.5 | >7 | >7 | — | >7 | 7> | 7> |
| Impact strength | 40 | 20 | 30 | 30 | — | >50 | >50 | >50 |
| Flexural strength | ◎ | X | ◎ | ◎ | — | ◎ | ◎ | ◎ |
| Acid resistance | ◎ | ◎ | ◎ | ◎ | — | ◎ | ◎ | ◎ |
| Alkali resistance | ◎ | ◎ | ◎ | ◎ | — | ◎ | ◎ | ◎ |
| Gasoline resistance | ◎ | ◎ | ◎ | ◎ | — | ◎ | ◎ | ◎ |
| Thinner rubbing | ◎ | ◎-○ | ◎ | ◎ | — | ◎ | ◎ | ◎ |
| Properties of the forcibly dried coated film (80° C.; 30 minutes; 7 days later) | | | | | | | | |
| Gloss | 92 | 93 | 93 | 92 | — | 93 | 92 | 93 |

TABLE 3-continued

|  | Example | | | | Comparative Example | | | |
|---|---|---|---|---|---|---|---|---|
|  | 6 | 7 | 8 | 9 | 1 | 2 | 3 | 4 |
| Polyisocyanate | P1 | P2 | P3 | P4 | T1 | T2 | DN-950 | A |
| Hardness | F-H | F-H | F-H | F-H | — | F-H | F | F |
| Adhesion strength | 100/100 | 85/100 | 100/100 | 100/100 | — | 100/100 | 100/100 | 100/100 |
| Erichsen | >7 | 1 | >7 | >7 | — | >7 | >7 | >7 |
| Impact strength | 30 | 10-20 | 30 | 30 | — | 30 | 40 | 30 |
| Flexural strength | ◎ | X | ◎ | ◎ | — | ◎ | ◎ | ◎ |
| Acid resistance | ◎ | ◎ | ◎ | ◎ | — | ◎ | ◎ | ◎ |
| Alkali resistance | ◎ | ◎ | ◎ | ◎ | — | ◎ | ◎ | ◎ |
| Gasoline resistance | ◎ | ◎ | ◎ | ◎ | — | ◎ | ◎ | ◎ |
| Thinner rubbing | ◎ | ◎-O | ◎ | ◎ | — | ◎ | ◎ | ◎ |

(*) In Comparative Example 1, the compatability of polyisocyanate T1 with "Acrydic A-800" was bad, and the same tests could not be performed.

The methods of testing the paints were as follows:

A. FORMULATION

Main component: "Acrydic A-800" (NV 50±1%; Gardner viscosity at 25° C. R to T; acid value <3; hydroxyl value 50±2; measured molecular weight 16,000)

Pigment: rutile-type titanium dioxide (PWC 35%)

Thinner: Solvesso 100/xylene/toluene/butyl acetate/ethyl acetate/Cellosolve acetate=10/40/20/10/10/10 (weight ratio)

Coating: Air sprayer, bar coater

Drying: Ordinary temperature drying at 20° C.; forced drying 80° C. for 30 minutes Film thickness: 35 to 45 micrometers

B. TESTING

Drying property (dust free time)

Evaluated by the state of adhesion of a copper powder with the passage of time.

Gloss 60-degree specular reflectance (%)

Hardness

The hardness of the coated film until "injury" occurs in it, as evaluated by Mitsubishi Uni Hardness.

Adhesion

A crosscut is formed on the coated film. A cellophane tape is applied to the surface having the crosscut and peeled off. The state of the surface is evaluated by visual observation.

Erichsen

MM

Impact strength

Du Pont-type, ½ inch, 500 g. χ (cm)

Flexural strength 2 mm φ

Chemical resistance

The same is immersed for 24 hours in 5% NaOH or 5% $H_2SO_4$; or immersed for 2 hours in gasoline.

Thinner rubbing

The sample is rubbed 100 times with a lacquer thinner (composed of toluene/butyl acetate/MIBK/butanol=50/25/20/5).

EXAMPLE 10

Clear varnishes composed of an acrylic polyol having a number average molecular weight of 18,000 and a hydroxyl value of 35 (NV=50.2%, viscosity X-Y, acid value 3.0; using a mixed diluent composed of toluene, xylene and butyl acetate) obtained by radical polymerization in a customary manner of an ethylenic hydrocarbon derivative containing styrene and methyl methacrylate as hard monomers and butyl acrylate and beta-hydroxyethyl methacrylate as soft monomers, and the polyisocyanates P1 to P4 were tested for drying property. The results are shown in Table 4.

TABLE 4

|  | Polyisocyanate | | | | Comparative polyisocyanate | | |
|---|---|---|---|---|---|---|---|
|  | P1 | P2 | P3 | P4 | T2 | DN-950 | A |
| Drying property (minutes) | 50 | 15 | 25 | 25 | 120 | 100 | 92 |

EXAMPLE 11

Example 6 was repeated except that 1.0 g of a 20% butyl Cellosolve solution of the bis(beta-methylcholine)adipate obtained in Referential Example 1 was used as the isocyanurating catalyst. A 15% ethyl acetate solution of a polyisocyanate containing an isocyanurate ring (P5) (NV=75.1%, viscosity=A1—A; NCO content=15.2%, M=632) was obtained.

The poilyisocyanate P5 had good compatibility with "Acrydic A-800" (polyol). When it was subjected to a drying test in combination with "Acrydic A-800", the dust free time was 65 minutes for a clear varnish, and 35 minutes for a white enamel. The other properties such as gloss of an ordinary temperature dried coated film and a forcibly dried coated film from the above paint were the same as in the case of using the polyisocyanate P1.

The foregoing Examples demonstrate that the composition of this invention has excellent weatherability and much improved drying property while conventional resin compositions for urethane paints have inferior drying property even when having good weatherability; and that the composition of this invention is non-yellowing and has excellent compatibility.

What is claimed is:

1. A process for producing a polyisocyanate containing an isocyanurate ring, which comprises reacting at least one diisocyanate compound selected from the group consisting of alkylene diisocyanates, cycloalkylene diisocyanates and aralkylene diisocyanates with a diol having a molecular weight of 100 to 1,000 and containing at least 3 hydrocarbon substituents per molecule in the presence of an isocyanurating catalyst.

2. A process for producing a polyisocyanate containing an isocyanurate ring, which comprises reacting at least one diisocyanate compound selected from the group consisting of alkylene diisocyanates, cycloalkylene diisocyanates and aralkylene diisocyanates with a diol having a molecular weight of 100 to 1,000 and containing at least 3 hydrocarbon substituents per molecule in the presence of an isocyanurating catalyst and a promoter containing reactive active hydrogen in the molecule.

3. A non-yellowing fast-drying resin composition for urethane paints comprising a polyisocyanate containing an isocyanurate ring obtained by reacting at least one diisocyanate compound selected from the group consisting of alkylene diisocyanates, cycloalkylene diisocyanates and aralkylene diisocyanates with a diol having a molecular weight of 100 to 1,000 and containing at least 3 hydrocarbon substituents per molecule in the presence of an isocyanurating catalyst, and an acrylic polyol having a number average molecular weight of 2,000 to 30,000 and a hydroxyl value of 20 to 200 as essential ingredients.

4. A non-yellowing fast-drying resin composition for urethane paints comprising a polyisocyanate containing an isocyanurate ring, which comprises reacting at least one diisocyanate compound selected from the group consisting of alkylene diisocyanates, cycloalkylene diisocyanates and aralkylene diisocyanates with a diol having a molecular weight of 100 to 1,000 and containing at least 3 hydrocarbon substituents per molecule in the presence of an isocyanurating catalyst and a promoter containing reactive active hydrogen in the molecule, and an acrylic polyol having a number average molecular weight of 2,000 to 30,000 and a hydroxyl value of 20 to 200.

5. The process of claim 1 or 2 wherein the diol has alkyl groups as the hydrocarbon substituents.

6. The process of claim 1 or 2 wherein the diol is 2,2,4-trimethyl-1,3-pentanediol.

7. The process of claim 1 or 2 wherein the isocyanurating catalyst is a compound having a low electron density and containing a strongly cationic atom or atomic grouping.

8. The process of claim 1 or 2 wherein the isocyanurating catalyst is a compound represented by the general formula

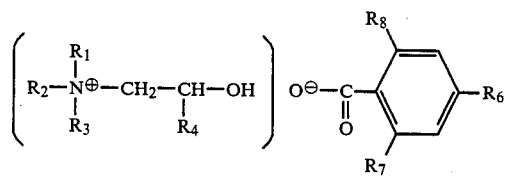

wherein
$R_1$, $R_2$ and $R_3$ are identical or different and each represents a $C_1$–$C_{20}$ hydrocarbon group or a $C_1$–$C_{20}$ hydrocarbon group containing a nitrogen, oxygen or sulfur atom, at least two of $R_1$, $R_2$ and $R_3$ may be linked to each other, $R_4$ represents a hydrogen atom, a $C_1$–$C_{20}$ hydrocarbon group or a $C_1$–$C_{20}$ hydrocarbon group containing a hydroxyl group, and $R_5$, $R_6$ and $R_7$ are identical or different and each represents a hydrogen atom or a $C_1$–$C_{20}$ hydrocarbon group.

9. The process of claim 1 or 2 wherein the isocyanurating catalyst is a choline-type dicarboxylate derivative represented by the general formula

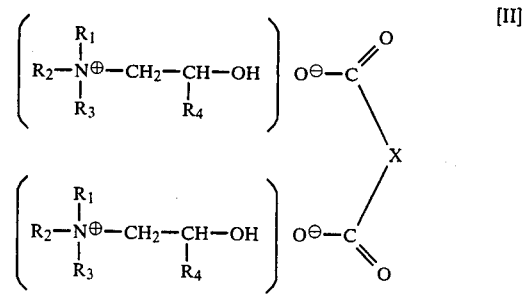

wherein
$R_1$, $R_2$ and $R_3$ are identical or different and each represents a $C_1$–$C_{20}$ hydrocarbon group or a $C_1$–$C_{20}$ hydrocarbon group containing a nitrogen, oxygen or sulfur atom, at least two of $R_1$, $R_2$ and $R_3$ may be linked to each other at the hydrocarbon groups bonded to the same quaternary nitrogen atom, $R_4$ represents a hydrogen atom or a $C_1$–$C_{20}$ hydrocarbon group, and X represents a $C_1$–$C_{20}$ dicarboxylic acid residue.

10. The process of claim 1 or 2 wherein the isocyanurating catalyst is used as a solution in an organic solvent in an amount of 0.001 to 0.2% by weight based on the total amount of the diisocyanate compound and the diol.

11. The process of claim 2 wherein the promoter is an alcohol.

12. A process for producing a polyisocyanate containing an isocyanurate ring, which comprises reacting at least one diisocyanate compound selected from the group consisting of alkylene diisocyanates, cycloalkylene diisocyanates and aralkylene diisocyanates in the presence of an isocyanurating catalyst represented by the general formula

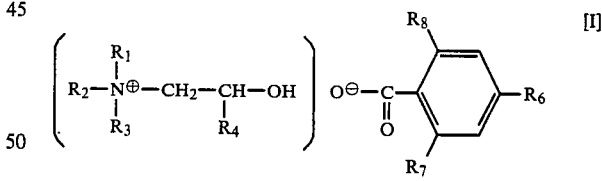

wherein
$R_1$, $R_2$ and $R_3$ are identical or different and each represents a $C_1$–$C_{20}$ hydrocarbon group or a $C_1$–$C_{20}$ hydrocarbon group containing a nitrogen, oxygen or sulfur atom, at least two of $R_1$, $R_2$ and $R_3$ may be linked to each other, $R_4$ represents a hydrogen atom, a $C_1$–$C_{20}$ hydrocarbon group or a $C_1$–$C_{20}$ hydrocarbon group containing a hydroxyl group, and $R_5$, $R_6$ and $R_7$ are identical or different and each represents a hydrogen atom or a $C_1$–$C_{20}$ hydrocarbon group.

13. A process for producing a polyisocyanate containing an isocyanurate ring, which comprises reacting at least one diisocyanate compounds selected from the group consisting of alkylene diisocyanates, cycloalkylene diisocyanates and aralkylene diisocyanates in the presence of an isocyanurating catalyst represented by the general formula

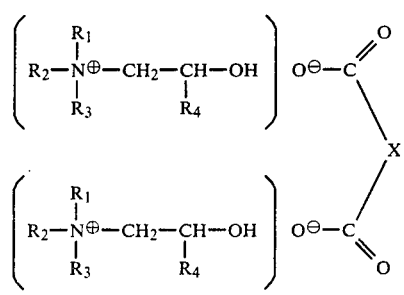

wherein $R_1$, $R_2$ and $R_3$ are identical or different and each represents a $C_1$-$C_{20}$ hydrocarbon group or a $C_1$-$C_{20}$ hydrocarbon group containing a nitrogen, oxygen or sulfur atom, at least two of $R_1$, $R_2$ and $R_3$ may be linked to each other at the hydrocarbon groups bonded to the same quaternary nitrogen atom, $R_4$ represents a hydrogen atom or a $C_1$-$C_{20}$ hydrocarbon group, and X represents a $C_1$-$C_{20}$ dicarboxylic acid residue.

14. The composition of claim 3 or 4 wherein the diol contains alkyl groups as the hydrocarbon substituents.

15. The composition of claim 3 or 4 wherein the diol is 2,2,4-trimethyl-1,3-pentanediol.

16. The composition of claim 3 or 4 wherein the isocyanurating catalyst is a compound having a low electron density and a strongly cationic atom or atomic grouping.

17. The composition of claim 3 or 4 wherein the isocyanurating catalyst is a compound represented by the general formula

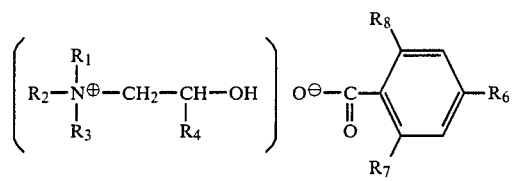

wherein $R_1$, $R_2$ and $R_3$ are identical or different and each represents a $C_1$-$C_{20}$ hydrocarbon group or a $C_1$-$C_{20}$ hydrocarbon group containing a nitrogen, oxygen or sulfur atom, at least two of $R_1$, $R_2$ and $R_3$ may be linked to each other, $R_4$ represents a hydrogen atom, a $C_1$-$C_{20}$ hydrocarbon group or a $C_1$-$C_{20}$ hydrocarbon group containing a hydroxyl group, and $R_5$, $R_6$ and $R_7$ are identical or different and each represents a hydrogen atom or a $C_1$-$C_{20}$ hydrocarbon group.

18. The composition of claim 3 or 4 wherein the isocyanurating catalyst is a choline-type dicarboxylate derivative represented by the general formula

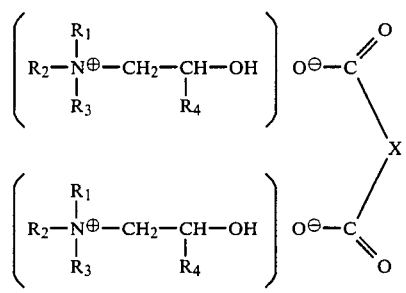

wherein $R_1$, $R_2$ and $R_3$ are identical or different and each represents a $C_1$-$C_{20}$ hydrocarbon group or a $C_1$-$C_{20}$ hydrocarbon group containing a nitrogen, oxygen or sulfur atom, at least two of $R_1$, $R_2$ and $R_3$ may be linked to each other at the hydrocarbon groups bonded to the same quaternary nitrogen atom, $R_4$ represents a hydrogen atom or a $C_1$-$C_{20}$ hydrocarbon group, and X represents a $C_1$-$C_{20}$ dicarboxylic acid residue.

19. The composition of claim 3 or 4 wherein the isocyanurating catalyst is used as a solution in an organic solvent in an amount of 0.001 to 0.2% by weight based on the total amount of the diisocyanate compound and the diol.

20. The composition of claim 3 or 4 wherein the promoter is an alcohol.

* * * * *

UNITED STATES PATENT AND TRADEMARK OFFICE
CERTIFICATE OF CORRECTION

PATENT NO. : 4,582,888
DATED : April 15, 1986
INVENTOR(S) : MITSUO KASE, ET AL.

It is certified that error appears in the above-identified patent and that said Letters Patent is hereby corrected as shown below:

IN THE SPECIFICATION

Column 3, line 11,
 in Formula [I], delete "$R_8$", insert --$R_5$--.

IN THE CLAIMS

Claim 8, line 4, (column 21, line 51),
 in Formula [I], delete "$R_8$", insert --$R_5$--.

Claim 12, line 8, (column 22, line 44),
 in Formula [I], delete "$R_8$", insert --$R_5$--.

Claim 17, line 4, (column 23, line 38),
 in Formula [I], delete "$R_8$", insert --$R_5$--.

Signed and Sealed this

Ninth Day of December, 1986

*Attest:*

DONALD J. QUIGG

*Attesting Officer*   *Commissioner of Patents and Trademarks*